United States Patent
Burtner et al.

(10) Patent No.: US 7,509,348 B2
(45) Date of Patent: Mar. 24, 2009

(54) RADIALLY EXPANDING AND CONTEXT-DEPENDENT NAVIGATION DIAL

(75) Inventors: Edwin R. Burtner, Everett, WA (US); Thomas V. Gruver, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 11/468,952

(22) Filed: Aug. 31, 2006

(65) Prior Publication Data

US 2008/0059913 A1    Mar. 6, 2008

(51) Int. Cl.
    *G06F 17/00* (2006.01)

(52) U.S. Cl. .................. 707/104.1; 707/101; 707/102; 707/103 R

(58) Field of Classification Search ............. 707/1–10, 707/100–104.1, 200–206; 715/809–855
See application file for complete search history.

(56) References Cited

U.S. PATENT DOCUMENTS

| | | | |
|---|---|---|---|
| 4,951,190 | A | 8/1990 | Lane et al. |
| 5,041,967 | A | 8/1991 | Ephrath et al. |
| 5,261,042 | A | 11/1993 | Brandt |
| 5,701,424 | A | 12/1997 | Atkinson |
| 5,708,787 | A | 1/1998 | Nakano et al. |
| 5,828,376 | A | 10/1998 | Solimene et al. |
| 6,188,406 | B1 | 2/2001 | Fong et al. |
| 6,795,097 | B1 | 9/2004 | Yamaguchi et al. |
| 7,010,758 | B2 | 3/2006 | Bate |
| 2002/0004933 | A1 | 1/2002 | Dzoba et al. |
| 2004/0230916 | A1 | 11/2004 | Salvatori et al. |
| 2006/0031322 | A1 | 2/2006 | Kessen et al. |
| 2007/0198949 | A1* | 8/2007 | Rummel ............... 715/810 |

OTHER PUBLICATIONS

Doss, Glen, "Designing Effective Web Navigation," Apr. 2002, Towson University, http://www.gdoss.com/web_info/web_navigation.pdf.

Kobsa, Alfred et al., "KN-AHS: An Adaptive Hypertext Client of the User Modeling System BGP-MS," http://www.ics.uci.edu/~kobsa/papers/1994-UM94-kobsa.pdf.

Lieberman, Henry, "There's More to Menu Systems Than Meets the Screen," SIGGRAPH 1985, San Francisco, Jul. 22-26, vol. 19, No. 3, pp. 181-189, © 1985 ACM.

Yin, Min and Shumin ZHAI, "Dial and See—Tackling the Voice Menu Navigation Problem with Cross-Device User Experience Integration," UIST'05, Oct. 23-27, 2005 Seattle, Washington, pp. 187-190, © 2005 ACM.

* cited by examiner

*Primary Examiner*—Isaac M Woo
(74) *Attorney, Agent, or Firm*—Perkins Coie LLP

(57) ABSTRACT

A method and system for displaying menus of menu items as a navigation dial is provided. A menu system provides a menu hierarchy for an application that includes menu items with menu sub-items and displays the menu items in a navigation dial. The menu hierarchy is dependent on the current context of the application. A navigation dial is a circular area in which the menu items are displayed near the perimeter of the area. When a user selects a menu item with menu sub-items, the menu system creates a radially expanding navigation dial and populates it with the menu sub-items. The radially expanding navigation dial is displayed outside the perimeter of the displayed navigation dial near the selected menu item.

19 Claims, 11 Drawing Sheets

RADIALLY EXPANDING AND CONTEXT-DEPENDENT NAVIGATION DIAL

BACKGROUND

Most computer applications provide a menu-driven user interface through which users can specify functions of the applications that are to be performed. The menus of these applications are typically defined as a hierarchy of menu items and, for each menu item, multiple menu sub-items. Each menu sub-item may also have menu sub-items. Thus, a menu hierarchy can be many levels deep. For example, a word processing program may provide a menu hierarchy that has at its highest level the menu items of file, edit, view, and insert. The next level for the file menu item may include the menu sub-items of new, open, and close, and the next level for the edit menu item may include the menu sub-items of cut, copy, and paste.

Applications typically display their highest level menu items in the menu bar at the top of the application window. To select a menu item, a user moves a pointer, such as a mouse pointer, to a menu item and selects the menu item. If the selected menu item has menu sub-items, then the application displays the menu sub-items in a drop-down list below the selected menu item. If a user selects a menu sub-item that itself has menu sub-items, then the application may display a drop-down list to the right of the selected menu sub-item. If a selected menu item has no menu sub-items, then it is a leaf menu item within the menu hierarchy and it represents a function to be performed by the application.

Applications may also use pop-up windows to display menu items near application content to which the menu items pertain. For example, a word processing program may display a pop-up window of paragraph formatting menu items near a paragraph that is to be reformatted. If a menu item within a pop-up window with menu sub-items is selected, then the application may display the menu sub-items in a drop-down list to the right of the selected menu item.

A difficulty with traditional menu bar techniques for selection of menu items within a menu hierarchy is that they force a user to move the focus of their attention from the content of the application to the menu bar. Because the user moves their focus, the user may not easily remember their prior focus after selection of the menu items. For example, a user who wants to periodically save an updated version of a word processing document may stop their editing of the document to select a file/save menu item. After the document is saved, the user may not precisely remember their train of thought in editing the document. In addition, because menu bars are typically an edge of the application window, users can find the repetitive strain of moving from content to the edge of the window tiring. Traditional menu bars also take up valuable window space that could otherwise be used to display application content. Although use of pop-up windows helps with some of these difficulties, a user can, as with a menu bar, find it difficult to navigate and precisely select menu items and menu sub-items. Each menu item in a drop-down list is displayed in a small area. It can be difficult for a user to position a mouse pointer over that area of a desired menu item and then select a menu sub-item that is displayed in a drop-down list without inadvertently selecting an undesired menu item and having its drop-down list display.

SUMMARY

A method and system for displaying menus of menu items as a navigation dial is provided. A menu system provides a menu hierarchy that includes menu items with menu sub-items. The menu system retrieves the menu items of the first level of the menu hierarchy and adds them to a navigation dial. A navigation dial is a circular area in which the menu items are displayed near the perimeter of the area-much like the hours of the day are displayed near the perimeter of a clock. The menu items may be represented by icons that are suggestive of their function. When a user selects a menu item of the navigation dial, the menu system determines whether the selected menu item has any menu sub-items. If the selected menu item has menu sub-items, then the menu system creates a radially expanding navigation dial and populates it with the menu sub-items. The radially expanding navigation dial is displayed outside the perimeter of the displayed navigation dial near the selected menu item. The radially expanding navigation dials represent concentric circles of menu items, menu sub-items, menu sub-sub-items, and so on. When a user selects a menu item that has no menu sub-items, then the menu system returns an indication of that menu item to the application as the menu item selected by the user.

The menu system may also allow the menu items within a navigation dial to be scrolled in a circular manner. If the number of menu items to be displayed within a navigation dial or a radially expanding navigation dial is greater than a threshold number, then the menu system displays that threshold number of menu items within the navigation dial and also displays scroll buttons. When a user selects a scroll button, the menu system selects a new set of menu items and displays them within the navigation dial.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
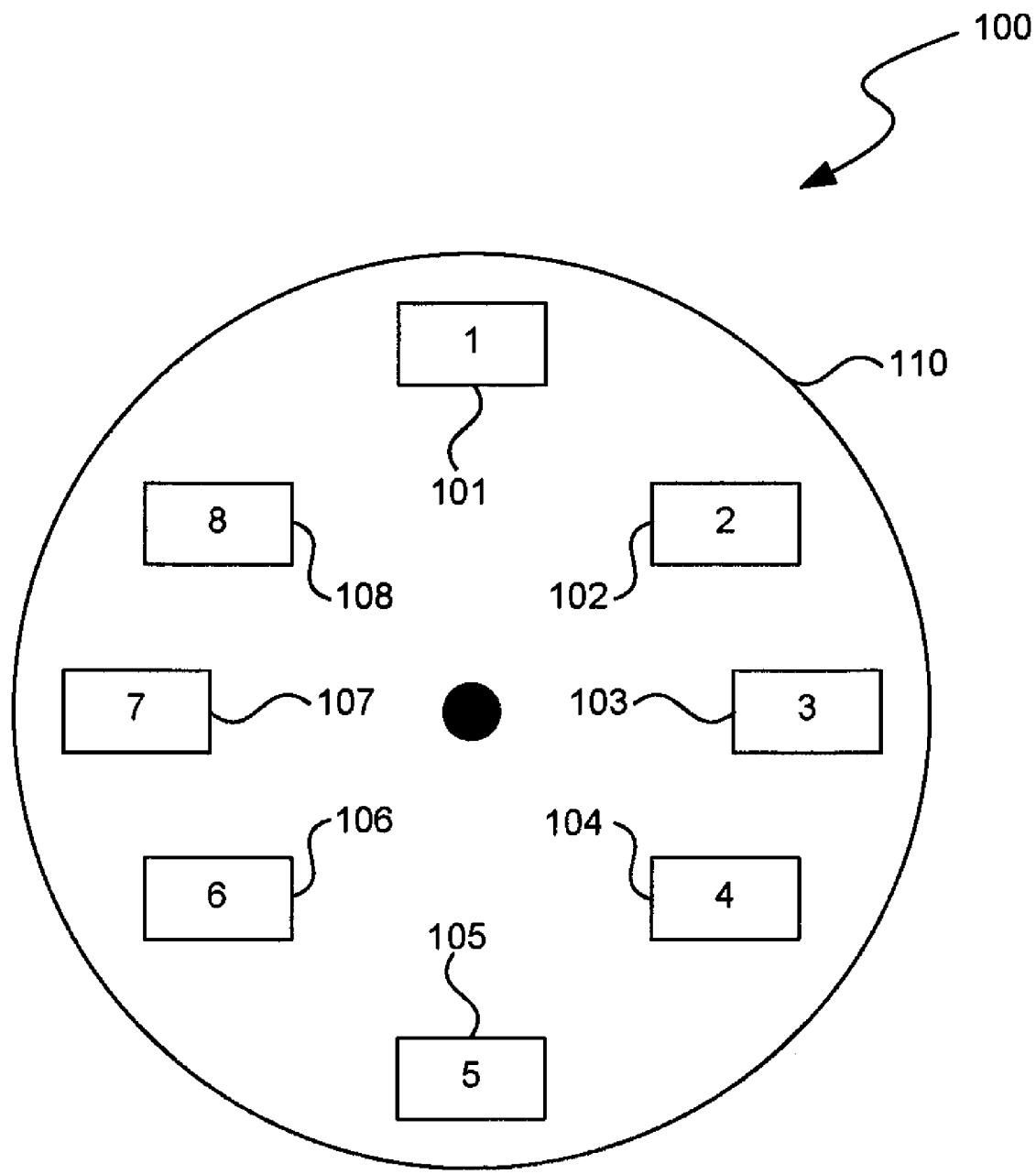
FIG. 1 is a diagram that illustrates a navigation dial in one embodiment.

A method and system for displaying menus of menu items as a navigation dial is provided. In one embodiment, a menu system provides a menu hierarchy that includes menu items with menu sub-items. The menu hierarchy may be represented in a menu data structure that is provided to the menu system by an application. When an application determines that a navigation dial is to be displayed (e.g., when a user right-clicks on content of the application), the application identifies the menu hierarchy that is appropriate for the current context of the application (i.e., context-dependent menu items). The application then provides that menu hierarchy to the menu system. The menu system retrieves the menu items of the first level of the menu hierarchy and adds them to a navigation dial. A navigation dial is a circular area in which the menu items are displayed near the perimeter of the area—much like the hours of the day are displayed near the perimeter of a clock. For example, if the first level of the menu hierarchy has eight menu items, then the menu system may arrange the menu items so that they are at 45 degree increments (e.g., every 7.5 minutes) about the navigation dial. The menu items may be represented by icons that are suggestive of their function. For example, an icon of a printer may represent a print menu item. The menu system then displays the navigation dial with the menu items. The menu system may display the navigation dial centered at a location specified by the application so that the menu items are displayed near the content of the application to which they relate. When a user selects a menu item of the navigation dial (e.g., by moving a mouse pointer to the menu item and selecting a mouse button), the menu system determines whether the selected menu item has any menu sub-items. If the selected menu item has menu sub-items, then the menu system creates a radially expanding navigation dial and populates it with the menu sub-items. The radially expanding navigation dial is displayed outside the perimeter of the displayed navigation dial near the selected menu item. The radially expanding navigation dials represent concentric circles of menu items, menu sub-items, menu sub-sub-items, and so on as described below in more detail. When a user selects a menu item that has no menu sub-items, then the menu system returns an indication of that menu item to the application as the menu item selected by the user. Because the navigation dial is circular and expands radially, a user can easily select menu items by moving a pointer to the perimeter of the navigation dial, which provides an increasingly wider area, and selecting the menu item. Also, the navigation dial displays context-sensitive menu items near the relevant content of an application.

In one embodiment, the menu system allows the menu items within a navigation dial to be scrolled in a circular manner. If the number of menu items to be displayed within a navigation dial is greater than a threshold number, then the menu system displays that threshold number of menu items within the navigation dial and also displays scroll buttons (e.g., arrows indicating clockwise or counterclockwise scrolling). When a user selects a scroll button, the menu system selects a new set of menu items and displays them within the navigation dial. For example, if there are 16 menu items, the menu system may display menu items 1-8 initially. When the counterclockwise scroll button is selected, the menu system may display menu items 2-9, and when the clockwise scroll button is selected, the menu system may display menu items 16-7. The menu system may also scroll multiple menu items at a time. For example, if menu items 1-8 are currently being displayed, when the counterclockwise scroll button is selected, the menu system may display menu items 5-12. Alternatively, the menu system may allow some menu items to be scrolled, but not others. For example, the menu system may display four non-scrollable menu items in the left half of a navigation dial and four scrollable menu items in the right half of the navigation dial. When a user selects a scroll button, the menu system scrolls menu items in the right half of the navigation dial, but not those in the left half. An application may specify which of the menu items are non-scrollable. For example, an application may specify that very popular menu items are to be non-scrollable. The menu system may also scroll menu sub-items in a radially expanding navigation dial as described below.

In one embodiment, the menu system allows descriptions of menu items to be displayed near the menu items of a navigation dial. When a user hovers a pointer over a menu item, the menu system may retrieve a description of that menu item from the menu hierarchy and display that description near the menu item. For example, when a user hovers a pointer over a printer icon representing a menu item, the menu system may retrieve a description that indicates the currently selected printer and display that description near the printer icon. When a user moves the pointer so that it is no longer hovering over a menu item, the menu system may remove the displayed description. In one embodiment, the menu system may display a description for each menu item simultaneously when requested by a user. The simultaneously display of the descriptions allows the user to review the descriptions of all the menu items without having to individually hover over the menu items.

Figure 2:
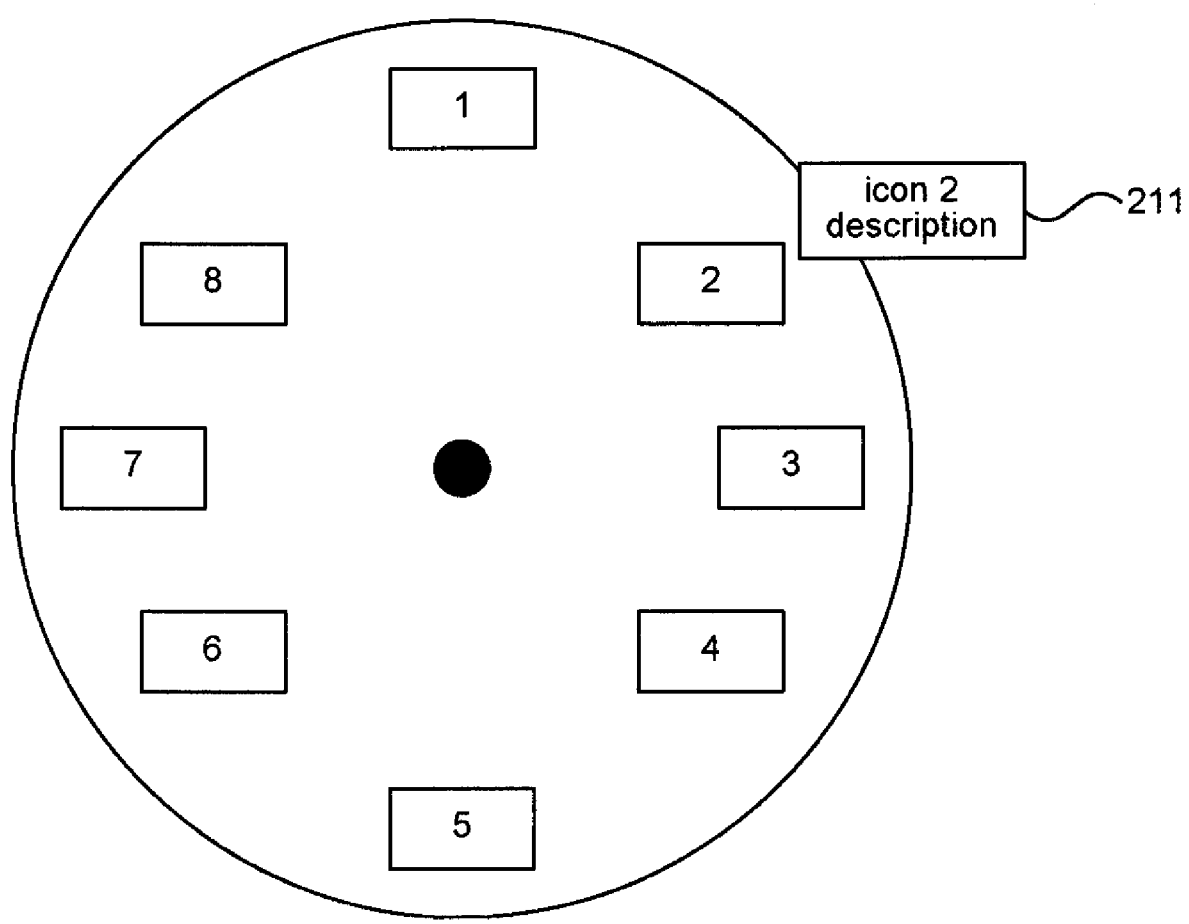
FIG. 2 is a diagram that illustrates the display of a description of a menu item near a navigation dial in one embodiment.

FIG. 1 is a diagram that illustrates a navigation dial in one embodiment. The navigation dial 100 includes a circular perimeter 110 and menu icons 101-108 corresponding to menu items 1-8. The menu icons are displayed equally spaced near the circular perimeter. When a user hovers over a menu item represented by an icon, the menu system displays a description of that menu item. FIG. 2 is a diagram that illustrates the display of a description of a menu item near a navigation dial in one embodiment. In this example, the user has hovered over menu item 2. In response, the menu system retrieves the description associated with menu item 2 from the menu hierarchy and displays it as description 211. If the user then hovers over menu item 8, the menu system retrieves a description associated with menu item 8 from the menu hierarchy and displays the description to the left of the icon for menu item 8.

Figure 3:
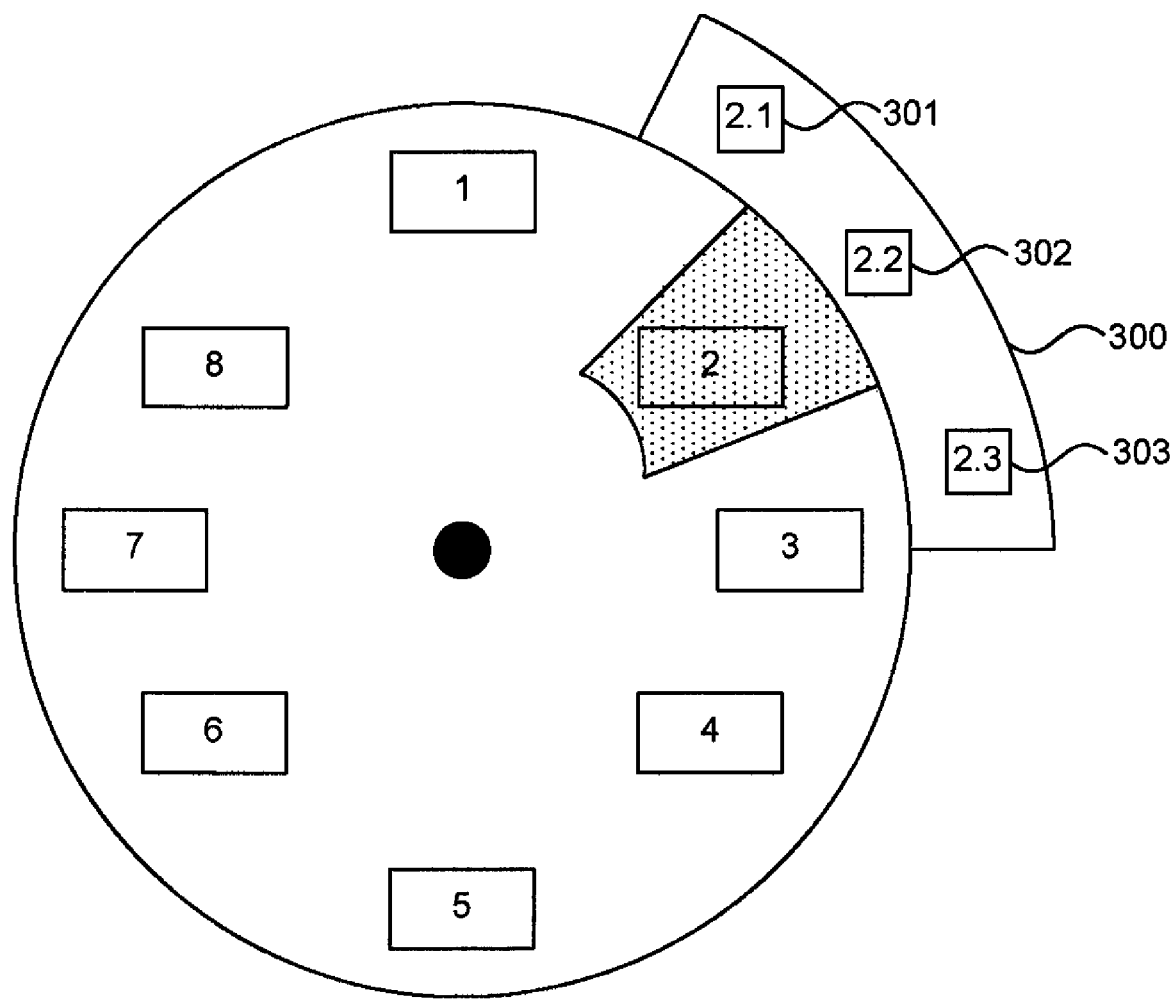
FIG. 3 is a diagram that illustrates a radially expanding navigation dial in one embodiment.

FIG. 3 is a diagram that illustrates a radially expanding navigation dial in one embodiment. In this example, the user has selected the icon for menu item 2 (e.g., moving a mouse pointer to the icon and clicking a button) as indicated by the highlight of the icon. In response, the menu system retrieves the menu sub-items for menu item 2 from the menu hierarchy and populates and displays a radially expanding navigation dial 300 with icons 301-303 corresponding to menu sub-items 2.1, 2.2, and 2.3 of menu item 2. A user can then move a pointer from the icon of menu item 2 to one of the icons of the menu sub-items.

Figure 4:
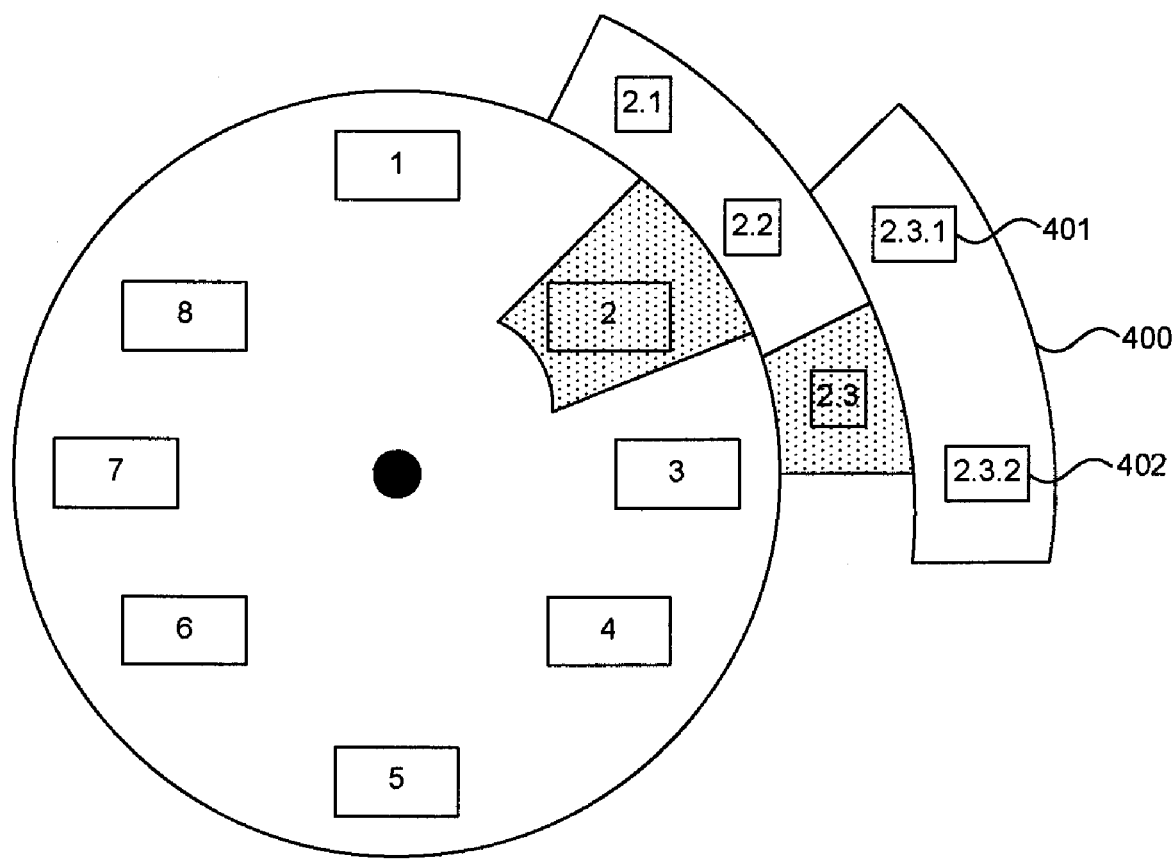
FIG. 4 is a diagram that illustrates a further radially expanding navigation dial in one embodiment.

FIG. 4 is a diagram that illustrates a further radially expanding navigation dial in one embodiment. In this example, the user has selected the icon for menu sub-item 2.3. In response, the menu system retrieves the menu sub-items for menu sub-item 2.3 from the menu hierarchy and populates and displays another radially expanding navigation dial 400. Navigation dial 400 includes icons 401 and 402 corresponding to menu sub-items 2.3.1 and 2.3.2. The radial expansion continues as long as displayed menu sub-items include further menu sub-items. In one embodiment, the menu system may remove the display of inner navigation dials to allow display of any number of radially expanding navigation dials. The menu system may also display a radial expansion that completely encircles the inner navigation dial. Thus, a navigation dial may include one or more concentric circles.

Figure 5:
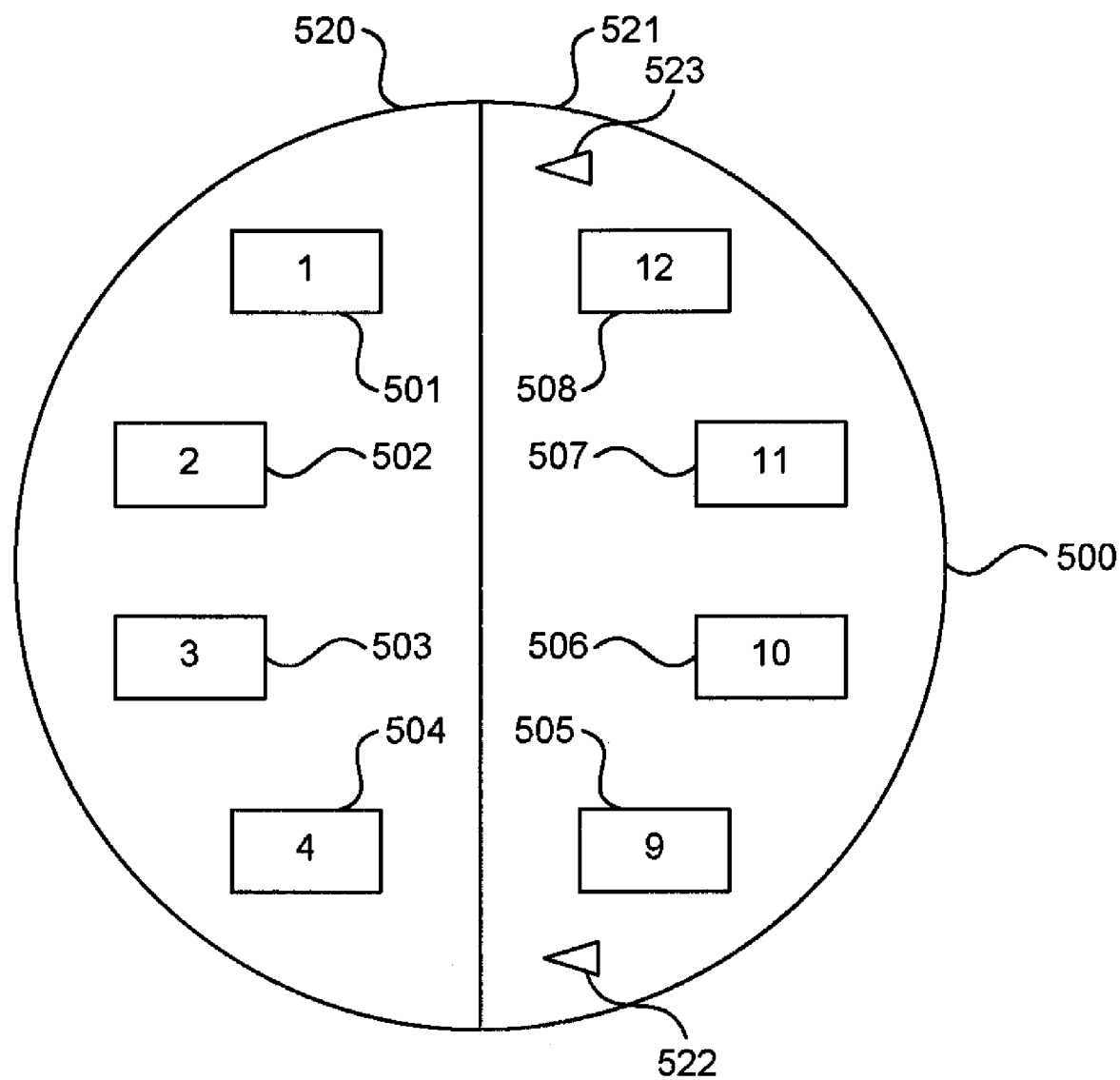
FIG. 5 is a diagram that illustrates a navigation dial that allows for scrolling of menu items.
Figure 6:
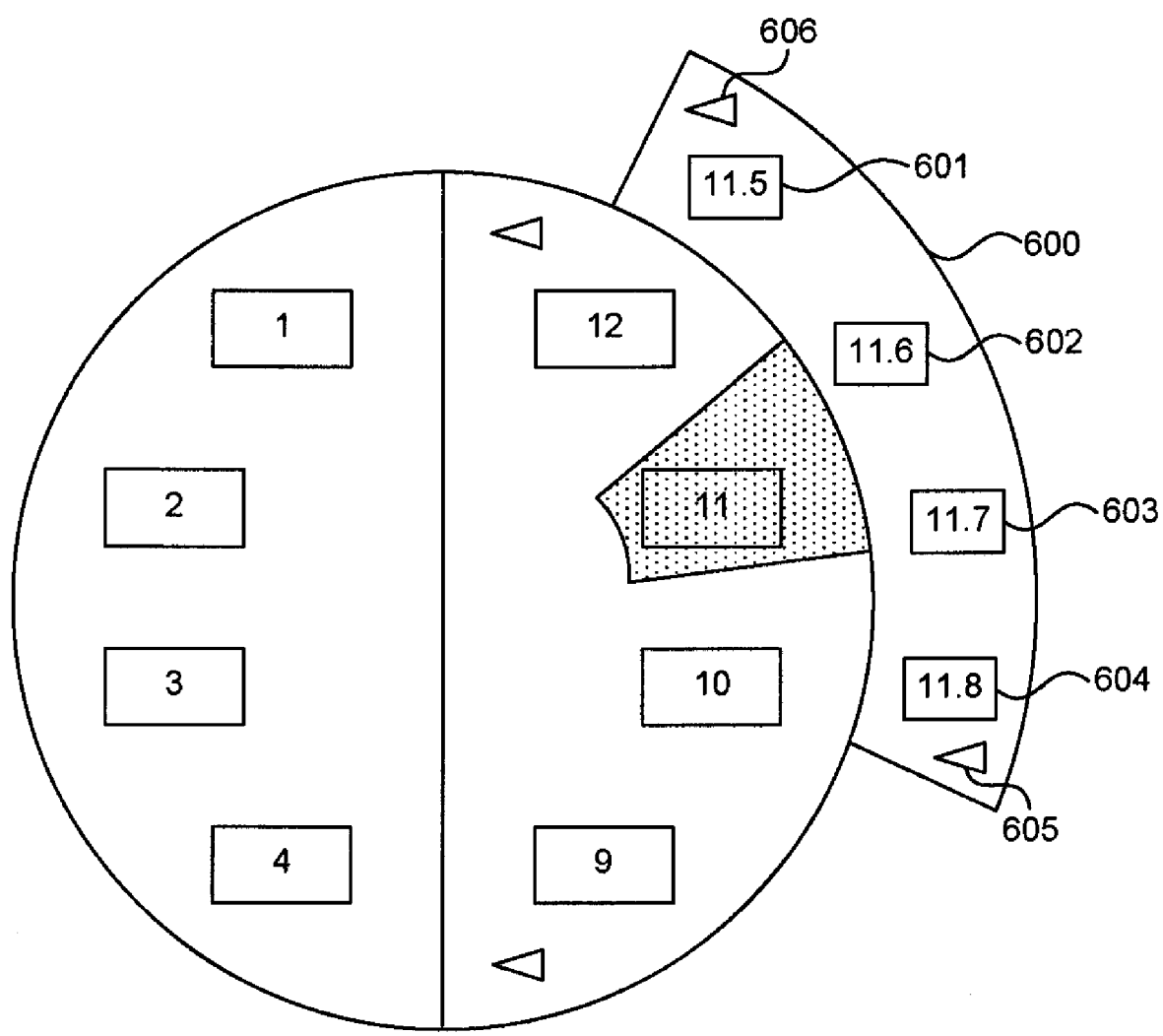
FIG. 6 is a diagram that illustrates a radially expanding navigation dial that allows for scrolling of menu sub-items.

FIG. 5 is a diagram that illustrates a navigation dial that allows for scrolling of menu items. Navigation dial 500 includes menu icons 501-508 corresponding to menu items 1-4 and 9-12. The navigation dial includes a left half 520 and a right half 521. The left half contains non-scrollable menu items 1-4 and the right half contains scrollable menu items 9-12. The right half also includes clockwise scroll button 522 and counterclockwise scroll button 523. When the counterclockwise scroll button is selected, the menu system replaces the icons for menu items 9-12 with the icons for menu items 8-11. When the clockwise scroll button is selected, the menu system replaces the icons for menu items 9-12 with the icons for menu items 10-13. FIG. 6 is a diagram that illustrates a radially expanding navigation dial that allows for scrolling of menu sub-items. Radially expanding navigation dial 600 includes icons 601-604 corresponding to menu sub-items 11.5, 11.6, 11.7, and 11.8. The radially expanding navigation dial also includes clockwise scroll button 605 and counterclockwise scroll button 606.

Figure 7:
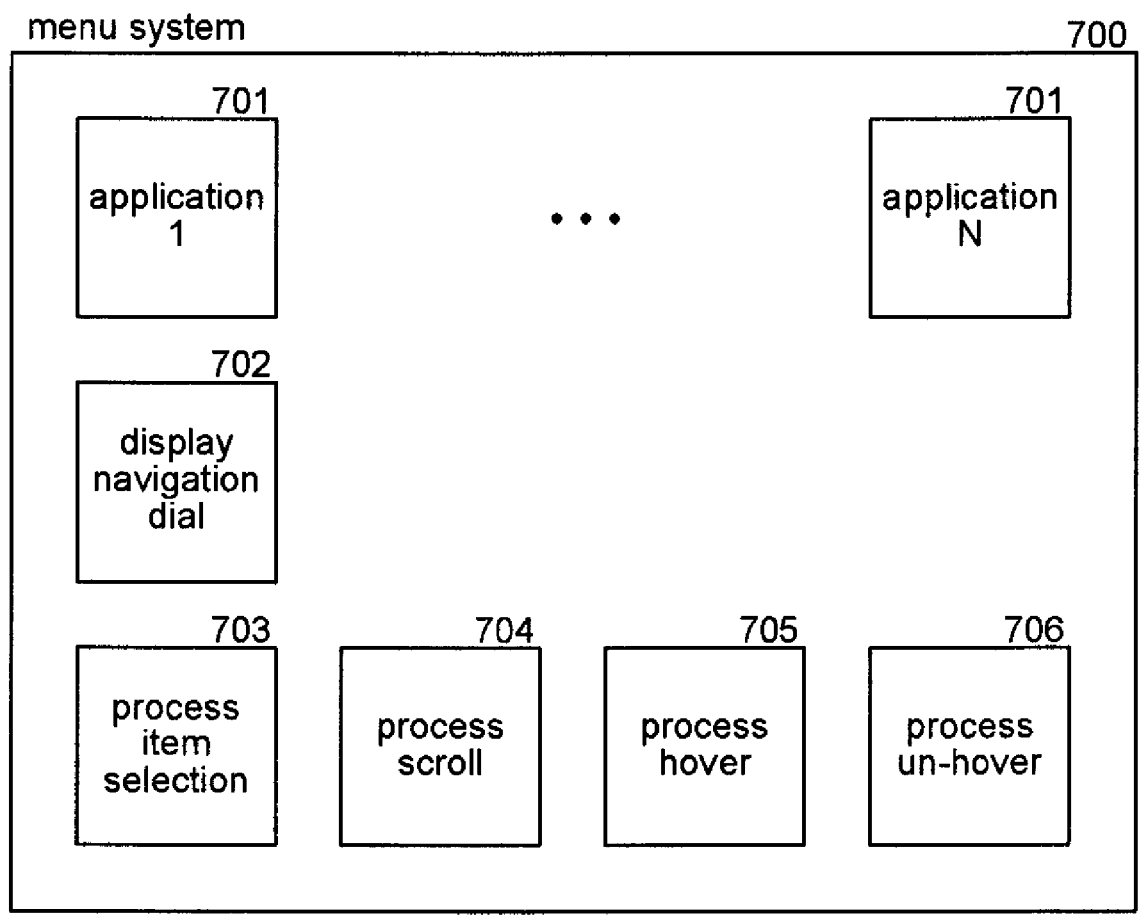
FIG. 7 is a block diagram that illustrates components of the menu system in one embodiment.

FIG. 7 is a block diagram that illustrates components of the menu system in one embodiment. A menu system 700 includes application programs 701 that interface with display navigation dial component 702. To display a navigation dial for a menu hierarchy, an application invokes the display navigation dial component passing the menu hierarchy and optionally passing the location at which the navigation dial is to be displayed. The display navigation dial component identifies the first level of menu items in the menu hierarchy, populates a navigation dial, displays the navigation dial at the specified location, and waits for a leaf menu item to be selected. The menu system also includes a process item selection component 703, a process scroll component 704, a process hover component 705, and a process un-hover component 706, which are invoked to process various events that occur during display of a navigation dial. The process item selection component is invoked when an item is selected and either indicates that the selected menu item is a leaf menu item or radially expands the navigation dial based on menu sub-items of the selected menu item. The process scroll component is invoked to scroll a navigation dial, including a radially expanding navigation dial. The process hover and process un-hover components are invoked to display and remove descriptions associated with menu items.

The computing devices on which the menu system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the menu system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The menu system may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The menu system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 8:
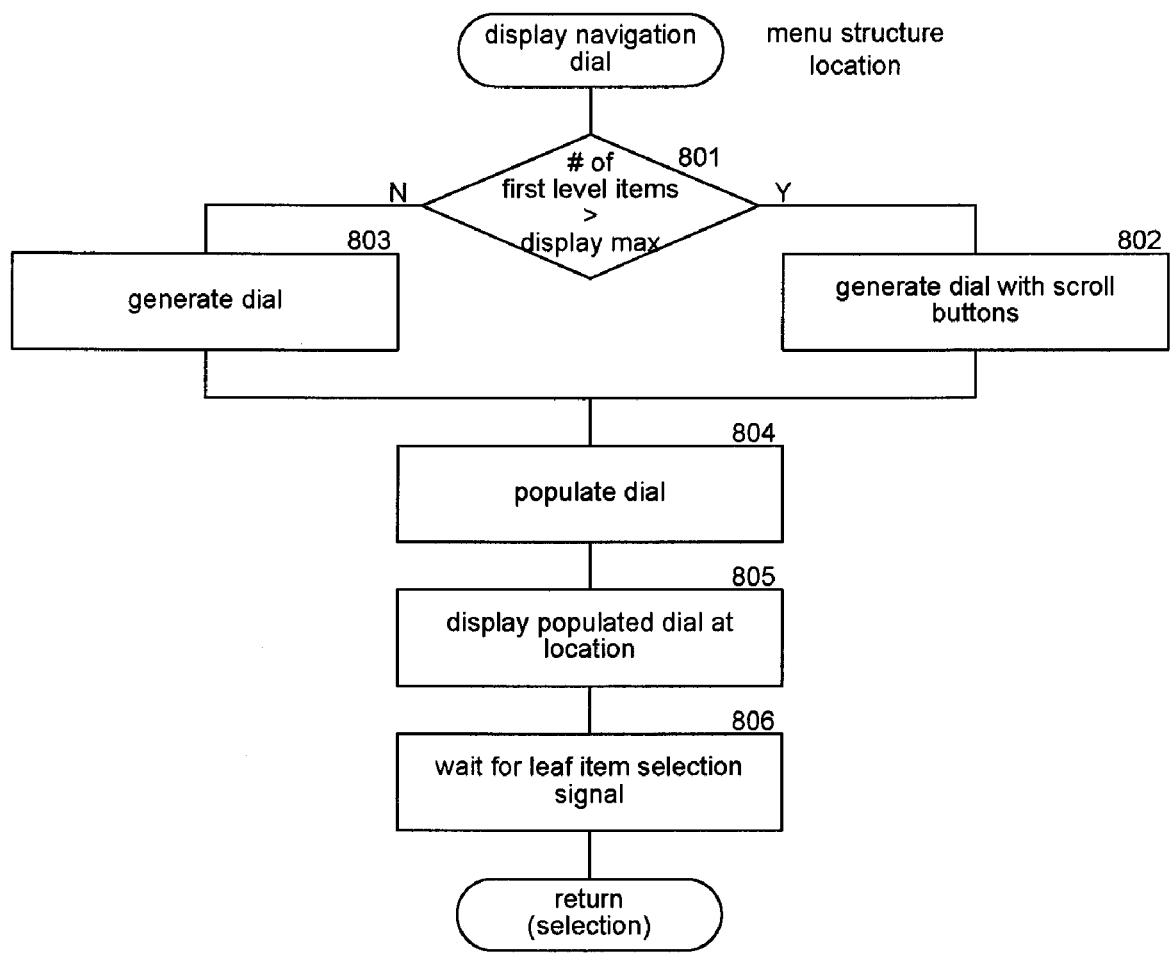
FIG. 8 is a flow diagram that illustrates the processing of the display navigation dial component of the menu system in one embodiment.

FIG. 8 is a flow diagram that illustrates the processing of the display navigation dial component of the menu system in one embodiment. The component is invoked by an application and is passed a menu structure and a location. In decision block 801, if the number of menu items at the first level of the menu hierarchy is greater than the maximum number that can be displayed in the navigation dial, then the component continues at block 802, else the component continues at block 803. In block 802, the component generates a navigation dial with scroll buttons. In block 803, the component generates a navigation dial without scroll buttons. In block 804, the component populates the navigation dial with the first-level menu items. In block 805, the component displays the populated dial at the passed location. In block 806, the component waits for selection of a leaf menu item or selection of no menu item (e.g., the user selects the escape key). The component then removes the navigation dial and returns an indication of the selection.

Figure 9:
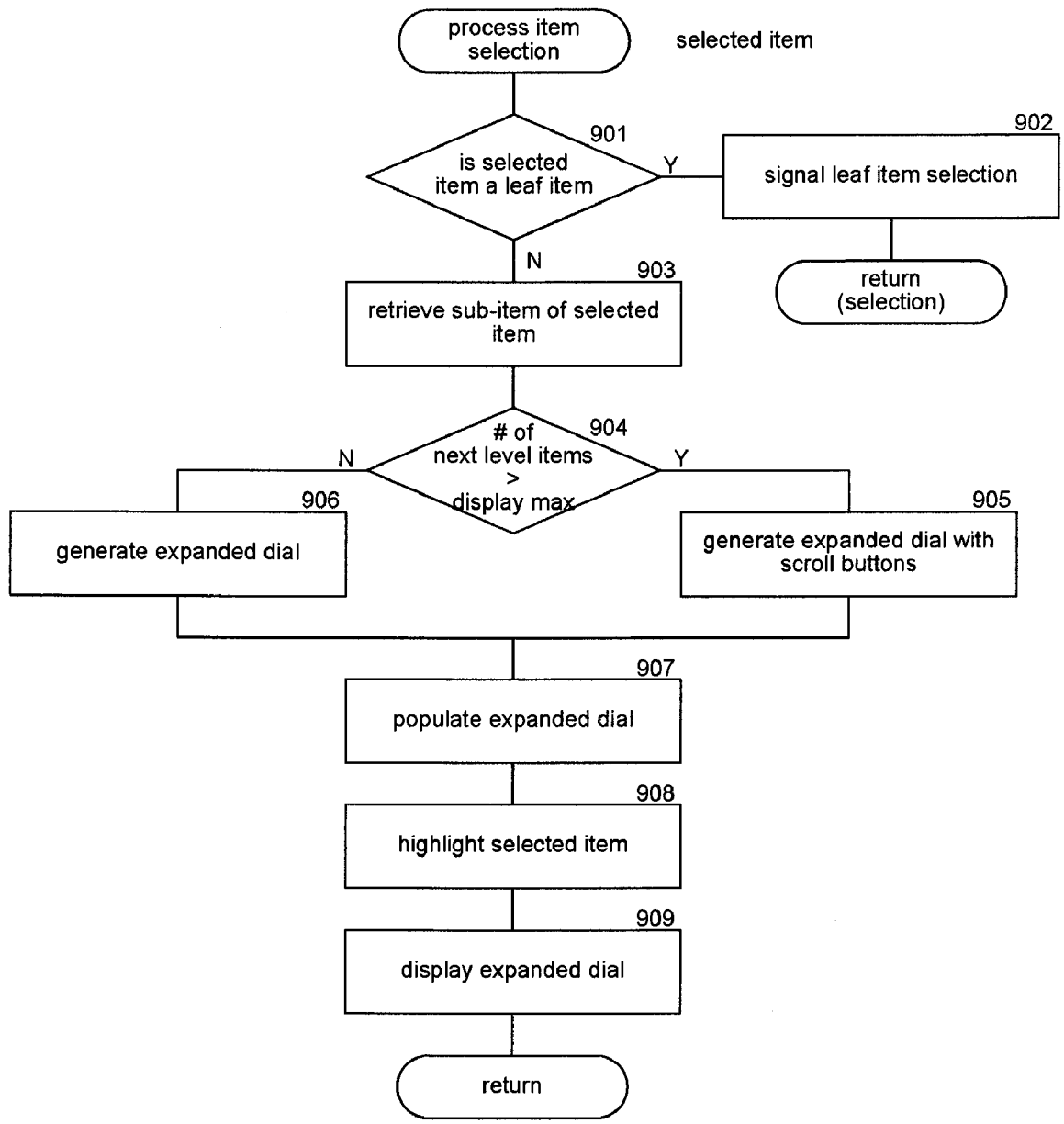
FIG. 9 is a flow diagram that illustrates the processing of the process item selection component of the menu system in one embodiment.

FIG. 9 is a flow diagram that illustrates the processing of the process item selection component of the menu system in one embodiment. The component is passed a selected menu item and either signals that a leaf item has been selected or displays a radially expanding navigation dial for the menu sub-items. In decision block 901, if the selected menu item is a leaf menu item, then the component continues at block 902, else the component continues at block 903. In block 902, the component signals that a leaf menu item has been selected and returns that selection. In block 903, the component retrieves the menu sub-items of the selected menu item. In decision block 904, if the number of menu sub-items is greater than the number of menu sub-items that can be displayed in the radially expanding navigation dial, then the component continues at block 905, else the component continues at block 906. In block 905, the component generates a radially expanding navigation dial with scroll buttons. In block 906, the component generates a radially expanding navigation dial without scroll buttons. In block 907, the component populates the radially expanding navigation dial. In block 908, the component highlights the selected menu item. In block 909, the component displays the populated radially expanding navigation dial near the selected item and then returns.

Figure 10:
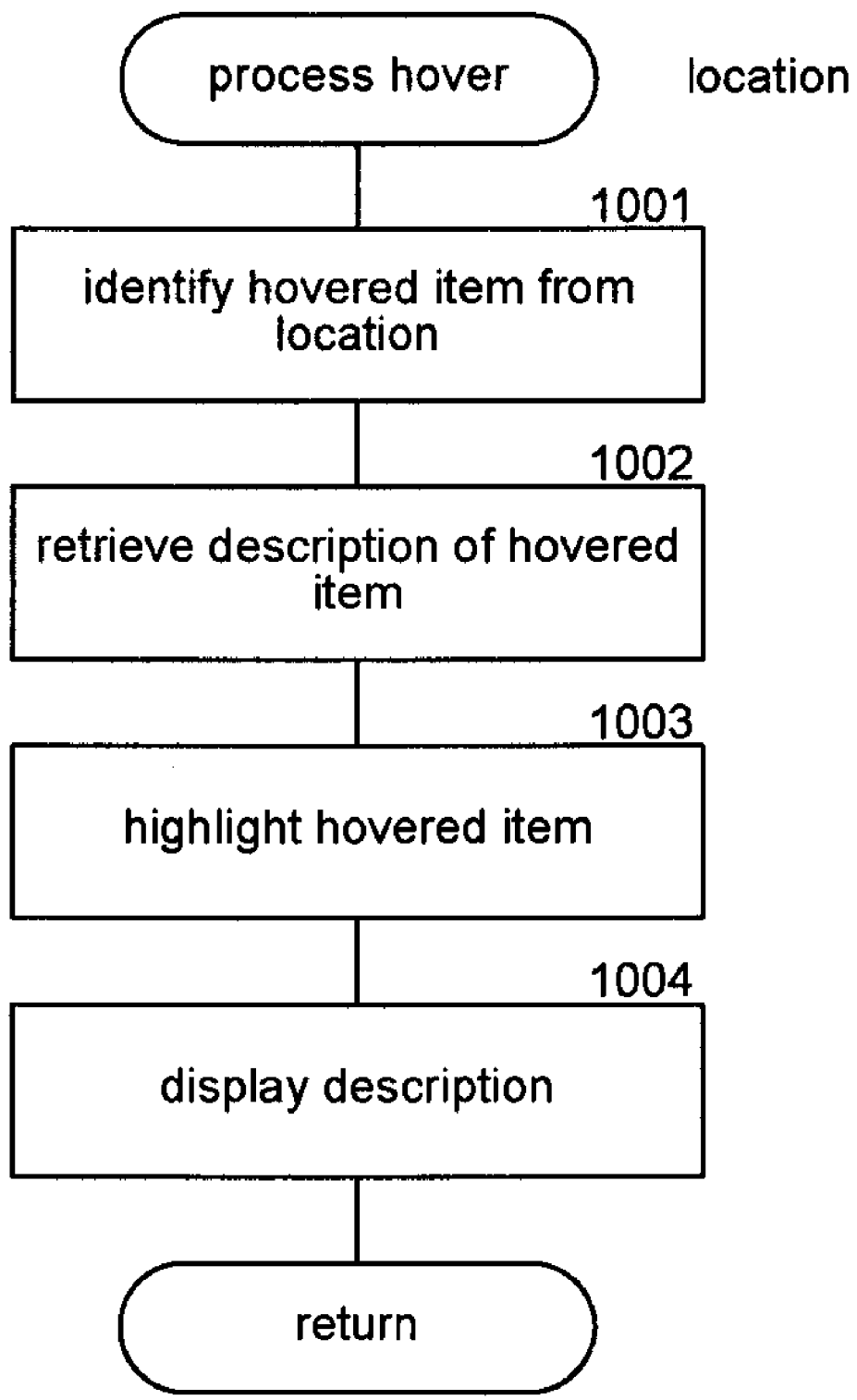
FIG. 10 is a flow diagram that illustrates the processing of the process hover component of the menu system in one embodiment.

FIG. 10 is a flow diagram that illustrates the processing of the process hover component of the menu system in one embodiment. The component is passed a location and identifies a hovered-over menu item, retrieves the description for that menu item, and displays that description near the menu item. In block 1001, the component identifies the hovered-over menu item from the passed location. In block 1002, the component retrieves a description associated with the menu item from the menu hierarchy. In block 1003, the component highlights the menu item. In block 1004, the component displays the description near the highlighted menu item and then returns.

Figure 11:
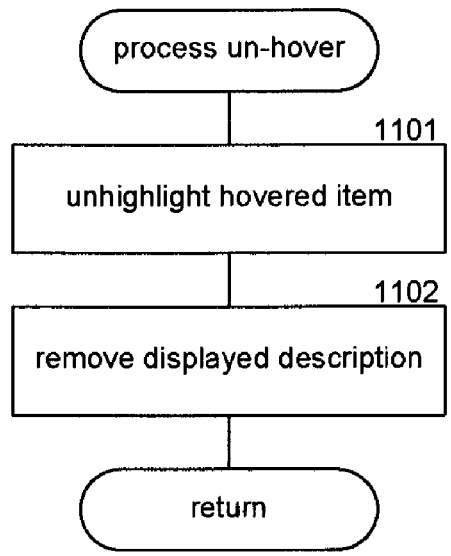
FIG. 11 is a flow diagram that illustrates the processing of the un-hover component of the menu system in one embodiment.

FIG. 11 is a flow diagram that illustrates the processing of the un-hover component of the menu system in one embodiment. The component is invoked when a user moves a pointer away from a menu item and removes the description that was displayed. In block 1101, the component removes the highlighting of the hovered-over menu item. In block 1102, the component removes the display description and then returns.

Figure 12:
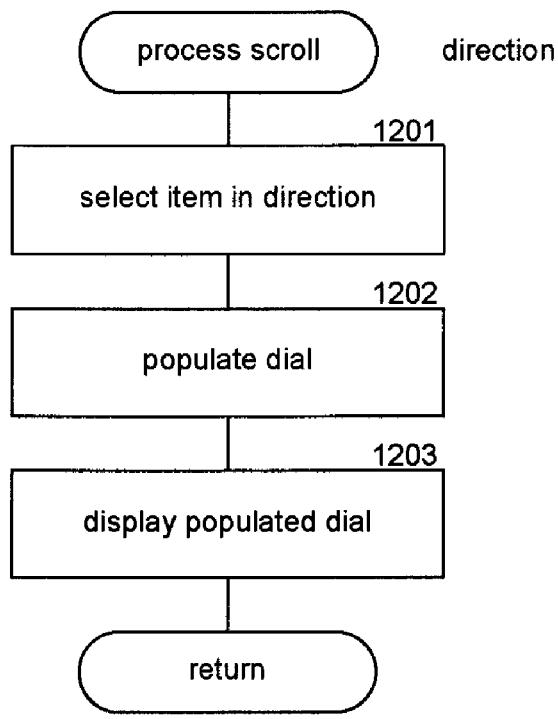
FIG. 12 is a flow diagram that illustrates the processing of the process scroll component of the menu system in one embodiment.

FIG. 12 is a flow diagram that illustrates the processing of the process scroll component of the menu system in one embodiment. The component is passed a direction and scrolls the menu items in a navigation dial. In block 1201, the component selects the items that are next to be displayed in the passed direction. In block 1202, the component populates the navigation dial with the selected menu items. In block 1203, the component displays the populated navigation dial and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, a navigation dial may have a non-circular perimeter such as an octagon when eight menu items are displayed. Also, a scroll button can be any type of scroll indicator and can be located inside of, outside of, or on the perimeter of a navigation dial. Accordingly, the invention is not limited except as by the appended claims.

We claim:

1. A method in a computing system for displaying menus via navigation dials that represent concentric circles of menu items, the method comprising:
    receiving a menu structure having a menu hierarchy of menu items with menu sub-items, the menu hierarchy having levels of menu items;
    receiving a location on a display;
    retrieving menu items of a first level of the menu hierarchy from the received menu structure;
    populating a first navigation dial with the retrieved menu items;
    displaying the populated first navigation dial near the received location; and
    when a user selects a menu item of the displayed first navigation dial,
        retrieving menu sub-items of the selected menu item from the received menu structure;
        populating a second navigation dial with the retrieved menu sub-items; and
        displaying the populated second navigation dial as a radially expanding navigation dial, wherein the first navigation dial and the second navigation dial share a common center point, and wherein the populated second navigation dial is displayed outside the perimeter of the populated first navigation dial near the selected menu item.

2. The method of claim 1 wherein when a user selects a menu item of a displayed navigation dial that is a leaf menu item, indicating that a leaf menu item has been selected and removing the display of the navigation dial.

3. The method of claim 1 wherein when a user hovers a pointer over a menu item of a displayed navigation dial, retrieving a description associated with the hovered-over menu item and displaying the retrieved description near the hovered-over menu item.

4. The method of claim 1 wherein when a user indicates to display menu item descriptions, retrieving descriptions associated with each menu item of a displayed navigation dial and displaying the retrieved descriptions near the associated menu items.

5. The method of claim 1 wherein when a number of retrieved menu items of the first level of the menu hierarchy exceeds a scroll threshold number, adding scroll indicators to the first navigation dial so that a user can scroll through at least a portion of the retrieved menu items.

6. The method of claim 5 wherein the first navigation dial contains some menu items that are not scrolled.

7. The method of claim 6 wherein the menu items that are not scrolled are most frequently used menu items.

8. The method of claim 6 wherein the menu items are scrolled in a clockwise or counterclockwise direction.

9. The method of claim 1 wherein the navigation dial continues to expand radially from the common center point as menu sub-items of menu sub-items are selected.

10. A computer-readable medium containing instructions for controlling a computing system to display menus via navigation dials that represent concentric circles of menu items, by a method comprising:
    receiving a menu structure having a hierarchy of menu items with menu sub-items, the hierarchy having levels of menu items;
    receiving a location on a display;
    retrieving menu items of a first level of the hierarchy from the received menu structure;
    generating a first navigation dial;
    when a number of retrieved menu items of the first level of the hierarchy does not exceed a scroll threshold number, populating the first navigation dial with retrieved menu items;
    when the number of retrieved menu items of the first level of the hierarchy exceeds the scroll threshold number,
        populating the first navigation dial with a portion of the retrieved menu items;
        adding scroll indicators to the populated first navigation dial so that a user can scroll through at least a portion of the retrieved menu items;
    displaying the populated first navigation dial near the received location; and
    when a user selects a menu item of the displayed navigation dial,
        retrieving menu sub-items of the selected menu item from the received menu structure:
        populating a second navigation dial with the retrieved menu sub-items; and
        displaying the populated second navigation dial as a radially expanding navigation dial, wherein the first navigation dial and the second navigation dial share a common center point, and wherein the populated second navigation dial is displayed outside the perimeter of the populated first navigation dial near the selected menu item.

11. The computer-readable medium of claim 10 wherein when a scroll indicator is selected, scrolling the retrieved menu items so that a new menu item is added to the navigation dial.

12. The computer-readable medium of claim 10 wherein the scrolling is in a clockwise or counterclockwise direction around the displayed navigation dial.

13. The computer-readable medium of claim 10 wherein the navigation dial contains some menu items that are not scrolled.

14. The computer-readable medium of claim 13 wherein the menu items that are not scrolled are most frequently used menu items.

15. The computer-readable medium of claim 10 wherein when the number of menu sub-items exceeds a scroll menu sub-item threshold, adding scroll indicators to the populated second navigation dial so that the sub-items can be scrolled.

16. A computing system for displaying menus via navigation dials that represent concentric circles of menu items, comprising:

a menu data structure having a hierarchy of menu items with menu sub-items, the hierarchy having levels of menu items;

a component that populates a first navigation dial with menu items of a level of the hierarchy;

a component that displays the populated first navigation dial as a circular navigation dial for the level of the hierarchy;

a component that, in response to a user selection of a menu item from the displayed first navigation dial, populates a second navigation dial with menu sub-items of a deeper level of the hierarchy; and a component that displays the populated second navigation dial as a radially expanding navigation dial, wherein the first navigation dial and the second navigation dial share a common center point, and wherein the populated second navigation dial is displayed outside the perimeter of the populated first navigation dial near the selected menu item.

17. The computing system of claim 16 including a component that, when a user selects a menu item of a displayed navigation dial that is a leaf menu item, indicates that a leaf menu item has been selected and removes the display of the navigation dial.

18. The computing system of claim 16 including a component that, when a user hovers a pointer over a menu item of a displayed navigation dial, retrieves a description associated with the hovered-over menu item and displays the retrieved description near the hovered-over menu item.

19. The computing system of claim 16 including a component that, when a number of retrieved menu items of a level of the hierarchy exceeds a scroll threshold, adds scroll indicators to a navigation dial so that a user can scroll through at least a portion of the retrieved menu items.

* * * * *

UNITED STATES PATENT AND TRADEMARK OFFICE
CERTIFICATE OF CORRECTION

| | | |
|---|---|---|
| PATENT NO. | : 7,509,348 B2 | Page 1 of 1 |
| APPLICATION NO. | : 11/468952 | |
| DATED | : March 24, 2009 | |
| INVENTOR(S) | : Edwin R. Burtner et al. | |

It is certified that error appears in the above-identified patent and that said Letters Patent is hereby corrected as shown below:

In column 8, line 43, in Claim 10, after "structure" delete ":" and insert -- ; --, therefor.

Signed and Sealed this
Third Day of May, 2011

David J. Kappos
*Director of the United States Patent and Trademark Office*